United States Patent [19]

Harandi et al.

[11] Patent Number: 4,867,950
[45] Date of Patent: Sep. 19, 1989

[54] CATALYST REGENERATION WITH FLUE GAS

[75] Inventors: Mohsen N. Harandi, Lawrenceville; Hartley Owen, Belle Mead, both of N.J.

[73] Assignee: Mobil Oil Corporation, New York, N.Y.

[21] Appl. No.: 107,709

[22] Filed: Oct. 13, 1987

[51] Int. Cl.$^4$ .................. B01J 8/04; B01J 23/90
[52] U.S. Cl. .................. 422/190; 422/142; 422/223
[58] Field of Search ............ 422/190, 191, 193, 223, 422/142; 208/70, 113, 155, 169; 502/34, 39, 52

[56] References Cited

U.S. PATENT DOCUMENTS

| | | | |
|---|---|---|---|
| 2,278,509 | 4/1942 | Brown | 252/242 |
| 2,391,327 | 12/1945 | Mekler | 252/242 |
| 2,609,345 | 9/1952 | Easly et al. | 502/52 |
| 2,845,409 | 6/1958 | Pennington | 260/93.1 |
| 3,046,235 | 7/1962 | King | 252/411 |
| 3,392,002 | 7/1968 | Hamilton et al. | 422/223 X |
| 3,960,978 | 6/1976 | Givens et al. | 260/683.15 R |
| 4,094,814 | 6/1978 | Lemberger et al. | 422/223 X |
| 4,218,338 | 8/1980 | Huin et al. | 422/190 X |
| 4,421,636 | 12/1983 | Dolan et al. | 208/113 |
| 4,456,779 | 6/1984 | Owen et al. | 585/415 |
| 4,542,114 | 9/1985 | Hegarty | 502/39 |

FOREIGN PATENT DOCUMENTS 1309589 3/1973 United Kingdom .................. 502/39

*Primary Examiner*—Michael S. Marcus
*Assistant Examiner*—Rebekah A. Griffith
*Attorney, Agent, or Firm*—Alexander J. McKillop; Charles J. Speciale; Lowell G. Wise

[57] ABSTRACT

Apparatus for regenerating zeolite-type catalyst used in fixed bed hydrocarbon conversion processes, such as the conversion of olefins to gasoline and diesel fuel. Regeneration is achieved using a portion of a flue gas stream to regenerate catalyst and preheat feedstock. Economies in equipment and operation are realized by employing a once-through configuration for the regenerator gas stream.

3 Claims, 2 Drawing Sheets

CATALYST REGENERATION WITH FLUE GAS

FIELD OF THE INVENTION

This invention relates to a process and an apparatus for regenerating the catalysts used in fixed bed hydrocarbon conversion process.

BACKGROUND OF THE INVENTION

The reaction of hydrocarbon feedstocks in the presence of catalysts to produce gasoline range products, diesel fuels, aromatics, or other valuable fuels and chemicals is frequently carried out using fixed catalyst beds at elevated temperature. These catalyst beds require periodic regeneration of the catalyst, commonly conducted by contacting the catalyst with an oxygen containing gas at elevated temperature in order to remove by combustion those coke and carbonaceous deposits responsible for the deactiviation of the catalyst. For continuous fixed bed catalytic processes, the process design generally incorporates at least two fixed bed catalyst reactors which are sequentially or alternately operated as a regenerator vessel or process vessel such that the catalyst is undergoing oxidative regeneration in one vessel while the alternate or "swing" vessel is converting the hydrocarbon feedstock to the desired product. In these processes provision is routinely made for the recirculation of the regeneration gas stream which requires recompression of the gas, makeup air compressor controls, filters and heat exchangers as needed to reconstitute the regenerator gas stream and recycle that stream under the precise conditions of temperature, pressure and composition needed to oxidatively remove the deleterious carbonaceous deposits on the catalyst. Examples of processes which use oxidative catalyst regeneration involving fixed bed swing reactors include reforming, catalytic hydrodesulfurization, catalytic dehydrogenation, the methanol-to-gasoline processes (MTG), and olefins upgrading such as the olefins-to-gasoline and distillate (MOGD) process, to name a few.

In order to facilitate the control of the composition of the gas, the flue gas generally used for regeneration is recycled. The prior art, such as U.S. Pat. No. 2,391,327 to Meckler, discloses processes for the regeneration of solid contact material used for promoting hydrocarbon conversion reactions using flue gas where the flue gas is generated in a regenerator gas combuster, recycled through heat exchange zones and filters and incorporates instrumentation to sense and adjust the composition of chemicals in the flue gas to the preferred ratios. The disclosure is illustrative of the complexities associated with the art of fixed bed catalyst regeneration using flue gas recycle and the degree of treatment and processing required for a recycle flue gas stream. Such treatment requires a significant investment in capital equipment and can be the source of inefficiencies in the overall process. Other examples in the prior art such as U.S. Pat. No. 2,278,509 to Brown and U.S. Pat. No. 2,215,868 to Bertetti are further illustrations in the prior art of inventions involving regeneration of solid catalysts using flue gas which is recycled. These inventions involving regenerator gas recycle are also faced with the problems noted heretofore of the requirement for substantial capital investment for heat exchange, recycle gas compression and chemical composition control in order to provide a recycle flue gas stream suitable for use in catalyst regeneration. The added costs and inefficiencies incurred in the course of providing a suitable recycle flue gas stream have represented a substantial problem and challenge to workers in the field of fixed bed catalyst regeneration.

It has been discovered that an available flue gas can be employed as the catalyst regenerating gas stream in a once through configuration consolidating flue gas and regenerating gas treatment steps. In particular, the process of this invention used available flue gas heat to preheat feedstock and oxidatively regenerate catalyst.

It is an object of the present invention to provide a process for the oxidative regeneration of catalysts employed in a fixed bed hydrocarbon conversion processes that is efficient and economically advantageous without requiring recycle of the regenerator gas stream.

It is another object of this invention to provide a process for the regeneration of fixed bed catalytic hydrocarbon conversion processes by combining available flue gas streams with catalyst regeneration in an efficient and economically advantageous configuration.

Yet another object of the present invention is to combine the catalyst regeneration of fixed bed hydrocarbon conversion processes with the catalyst regenerator operations of a fluid catalytic cracking process in a manner so as to achieve maximum utilization of commonly useful equipment and the energy resources in the FCC catalyst regenerator flue gas stream.

SUMMARY OF THE INVENTION

The objects of the present invention are achieved in a process using an available flue gas stream, such as from an oxidative catalyst regeneration zone of the catalyst regenerator vessel of a fluid catalytic cracking process, to provide heat to generate steam or preheat the feed stream to the process reactor of a fixed bed catalyst conversion process, such as a Mobil olefin-to-gasoline and diesel process, then to oxidatively regenerate the catalyst in a fixed bed catalyst regenerator. Following these steps the flue gas streams are combined and treated in the flue gas cooler and electrostatic precipitator before discharging to the atmosphere without recycling.

The foregoing process is accomplished by first withdrawing a portion of the FCC flue gas stream and adjusting the composition of that stream to provide an oxidizing flue gas stream essentially free of FCC catalyst fines useful for catalyst regeneration. The portion so withdrawn is partially cooled by generating steam or heat exchange with the feedstock stream to the fixed bed hydrocarbon conversion process reactor. Then the heated hydrocarbon feedstock stream is passed to the process reactor over active catalyst particles under such conditions as necessary to convert the feedstock stream to hydrocarbon products which are then separated. A portion of the partially cooled oxidizing flue gas stream, after partial cooling, is contacted with deactivated catalyst having carbonaceous deposits thereon in the swing or alternate catalyst oxidative regenerating reactor for a process such as Mobil Olefins to Gasoline/Distillate (MOGD). The effluent gas stream from the catalyst regenerating reactor is combined with the remaining portion of partially cooled oxidizing flue gas stream and the undiverted portion of the flue gas stream. The combined streams are cooled in the flue gas cooler, treated to remove particulates and discharged to the atmosphere, without recycling.

Adjusting the composition of the portion of the flue gas stream, such as from the FCC regeneration zone, to provide an oxidizing flue gas stream is accomplished by mixing the stream with air, nitrogen or fuel gas as required to provide an appropriate oxidizing stream composition. The air stream for such mixing is further provided by air from the main air blower outlet employed in connection with providing combustion air for the FCC oxidative catalyst regeneration zone.

DESCRIPTION OF THE PREFERRED EMBODIMENTS

One preferred embodiment of the present invention involves the integration of the catalyst oxidative regenerator operation of a fluid catalytic cracking reactor with a hydrocarbon fixed bed catalytic conversion process such as the Mobil olefins-to-gasoline and distillate process (MOGD). Fluid catalytic cracking is a process well known in the art requiring no further elaboration or explanation herein. Suffice it to say that catalyst regeneration in FCC is performed oxidatively and provides a source of flue gas for integration with MOGD to regenerate the catalyst employed in that process.

Figure 2:
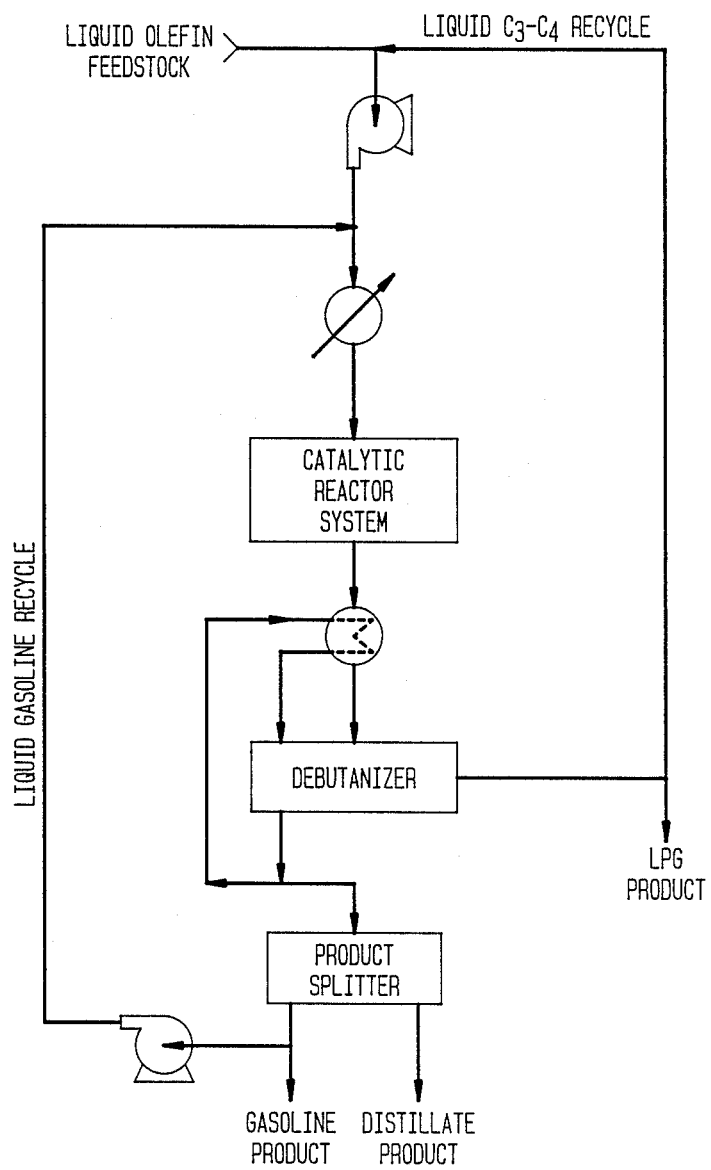
FIG. 2 is a schematic diagram showing the olefin upgrading process configuration.

For MOGD, the flow diagram of FIG. 2 of the drawing represents the overall process. The olefinic feedstock is usually supplied as a liquid stream under moderate superatmospheric pressure and warm ambient temperature. Ordinarily, the feedstock is substantially below the process reactor pressure, and may be combined with recycled liquid diluent which may be rich in olefinic gasoline or $C_3-C_4$ alkanes at similar temperature and pressure. Following pressurization of the combined olefin-recycle and/or gasoline feedstreams, it may be passed through the catalytic reactor system, which includes multiple fixed bed reactors operatively connected with the heat exchange system, as described later. The reactor effluent may be cooled by heat exchange with a debutanizer bottoms fraction. A condensed debutanizer overhead stream is recovered for recycle and the heavier hydrocarbons obtained by oligomerization of the feedstream are fractionated in a product splitter unit to yield a $C_{10}+$ (330° F.+boiling point) and a $C_5-C_9$ gasoline fraction (boiling range of 125° F. to 330° F.) in varying amount.

Since the gasoline product comprises a major fraction of unsaturated aliphatic liquid hydrocarbons, it may be recovered and hydrotreated to produce spark-ignited motor fuel if desired. Optionally, all or a portion of the olefinic gasoline range hydrocarbons from the splitter unit may be recycled for further conversion to heavier hydrocarbons in the distillate range. This may be accomplished by combining the recycle gasoline with lower olefin feedstock and diluent prior to heating the combined streams.

Process conditions, catalysts and equipment suitable for use in the MOGD process are described in U.S. Pat. Nos. 4,456,799 (Owen et al.), 3,960,978 (Givens et al.), 4,021,502 (Plank et al.), and 4,150,062 (Garwood et al.). The above disclosures are incorporated herein by reference.

Recent developments in zeolite technology have provided a group of medium pore siliceous materials having similar pore geometry. Most prominent among these intermediate pore size zeolites is ZSM-5, which is usually synthesized with Bronsted acid active sites by incorporating a tetrahedrally coordinated metal, such as Al, Ga, or Fe, within the zeolitic framework. These medium pore zeolites are favored for acid catalysis; however, the advantages of ZSM-5 structures may be utilized by employing highly siliceous materials or crystalline metallosilicate having one or more tetrahedral spaces having varying degrees of acidity. ZSM-5 crystalline structure is readily recognized by its X-ray diffraction pattern, which is described in U.S. Pat. No. 3,702,866 (Argauer, et. al.), incorporated by reference.

The acidic medium pore zeolite-type catalyst materials suitable for use in the MOGD process are effective in oligomerizing lower olefins, especially propene and butene to higher hydrocarbons. The unique characteristics of acid ZSM-5 catalyst are particularly suitable for use in the MOGD system. Other members of the class of zeolites for use in MOGD are exemplified by ZSM-5/ZSM-11, ZSM-11, ZSM-12, ZSM-23, ZSM-35, ZSM-38, ZSM-48 and other similar materials.

Figure 1:
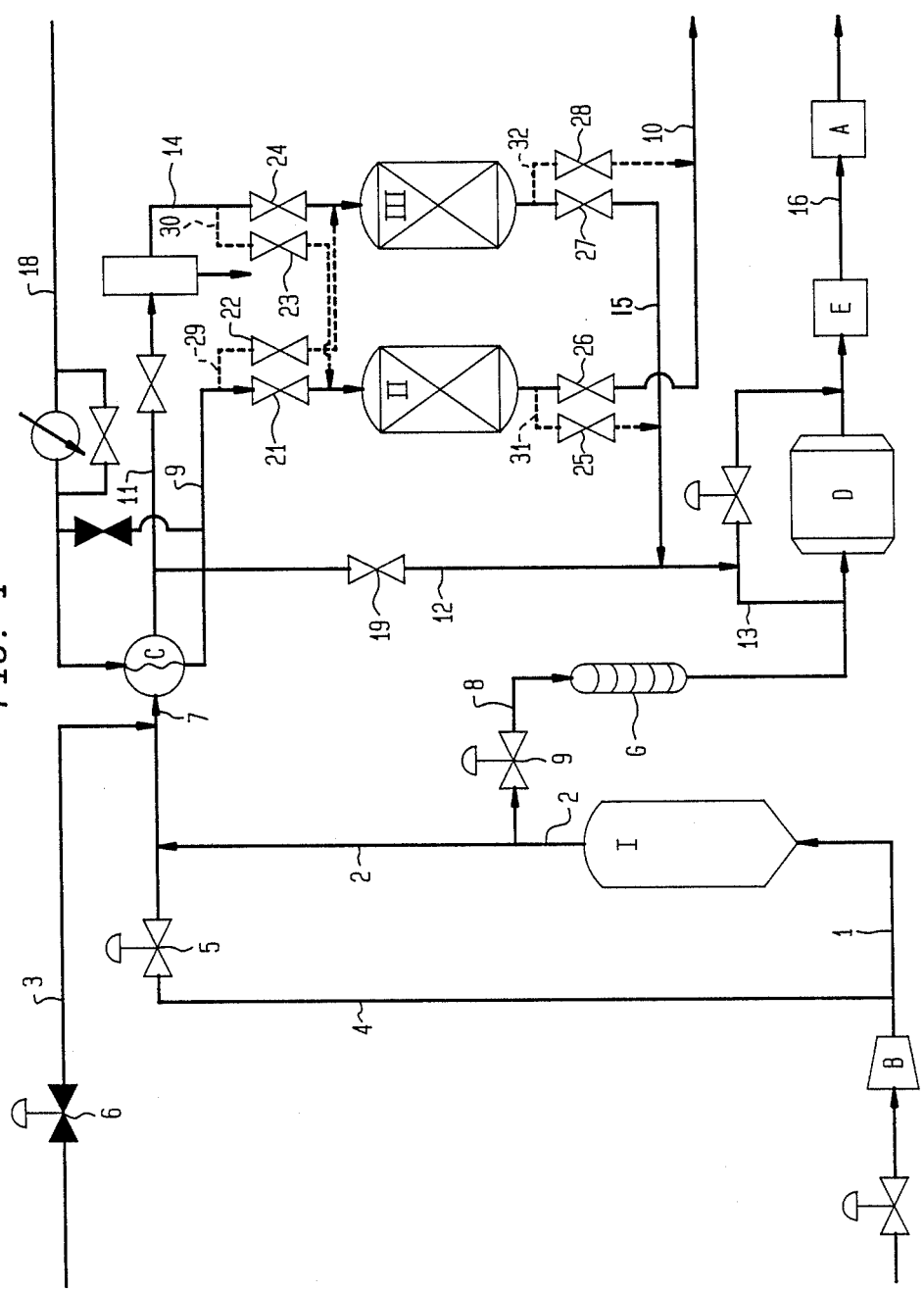
FIG. 1 is a process flow diagram illustrating the integration of FCC regenerator flue gas with the catalyst regeneration section of the Mobil olefin-to-gasoline and diesel (MOGD) upgrading process.

Referring to FIG. 1, a process flow diagram of a preferred embodiment of the instant invention is presented. The diagram illustrates the utilization of a flue gas taken from the catalyst regenerator of a fluid catalytic cracking unit as it is employed as the regenerator gas stream for an MOGD process converting olefins to gasoline using dual fixed bed catalytic reactors which alternate as process reactor or catalyst regenerating reactor. The aforenoted alternate or swing mode of operation for fixed bed process reactor and zeolite catalyst regenerating reactor is controlled by valving and conduits well established in the are for alternating those reactors as shown in FIG. 1 as valves 21–28 and alternate conduits shown by dashed lines 29–32. In FIG. 1, (I) is the fluid catalytic cracking regenerator wherein catalyst is received for oxidative regeneration from the cracking unit through conduits not shown. Combustion air is supplied to the unit through conduit 1 from the FCC regenerator air compressor B. As it is passed in contact with hot circulating catalyst in the regenerator vessel (I), the combustion air burns off coke and carbonaceous deposits on the catalyst and exits the reactor through conduit 2 generally at a temperature between 1100° and 1450° F., but preferably about 1350° F. and a pressure between 20 and 40 psig, but preferably about 30 psig. Typically the composition of the exiting flue gas is low with respect to oxygen as a result of the combustion reaction and consists primarily of nitrogen, carbon dioxide and carbon monoxide. In addition to the aforementioned components, the flue gas contains substantial amounts of water vapor representing about 10 volume percent of the flue gas. The water partial pressure in the flue gas is about 3–5 psia. If required the water partial pressure can be reduced to about 1 psia by cooling the flue gas and removing the condensed water before using the flue gas for fixed bed regeneration. The composition of the flue gas exiting the FCC regenerator through conduit 2, to the extent that it is depleted in oxygen and enriched in reducing gases such as carbon monoxide, departs from the preferred composition of a catalyst regeneration gas useful for the oxidative regeneration of catalysts used in fixed bed hydrocarbon conversion processes. To burn off carbonaceous deposits on those catalyst, a regenerator gas stream with a useful oxygen content is required. Therefore, in the instant invention, a provision is made to modify the composition of the flue gas either through dilution with nitrogen, or addition of fuel gas, such as refinery gas, to reduce oxygen content, through conduit 3 or by the addition of air through conduit 4 as provided from the FCC regenerator air compressor unit B. Under flue gas conditions, the addition of fuel gas thereto results in auto-ignition, consuming oxygen to an appropriate, predetermined concentration. Suitable valves and controls 5 and 6 are included to achieve the compositional changes as may be required in the flue gas.

Conventionally, the flow of flue gas exiting an FCC catalyst regenerator through conduit 2 is substantially in excess of the amount of gas that is required as a source of regenerator gas for fixed bed catalytic hydrocarbon conversion processes, particularly when the oxygen content of that gas has been augmented with air from the FCC air compressor. Further, the total flue gas flow cannot exceed the maximum pressure drop that can be tolerated through the MOGD regenerator system. Therefore, excess flue gas is sent 8 through the FCC flue gas processing system consisting of pressure control valve 9, orifice chamber G, flue gas cooler D, electrostatic precipitator E and stack A. That quantity of FCC regenerator flue gas not required as a source of MOGD catalyst regenerator gas is withdrawn through conduit 12 and associated valving 19 and passed to an FCC flue gas cooler while a typically minor portion of said flue gas is treated as described heretofore and constituted as a regenerator gas at a temperature between 1100° and 1450° F. but preferably about 1350° F. and a pressure of 20 to 40 psig but preferably 30 psig. The FCC flue gas derived regenerator gas stream is passed by conduit 7 into a heat exchanger C to generate steam or for indirect heat transfer to the MOGD process feed stream entering the heat exchanger through conduit 18. Before entering the MOGD regenerator, particulates are removed from the flue gas stream, typically by filtration.

In the process side MOGD reactor (II) the olefinic feedstock, passed by conduit 20, is contacted with a fixed bed zeolite-type catalyst to produce predominantly gasoline or distillate products under the conditions described in the aforenoted referenced patents. The predominantly gasoline and/or distillate products are carried from the reactor by conduit 10, processed by heat exchange and separation techniques to produce the products as also described in the aforenoted referenced patents.

The MOGD regenerator gas derived from flue gas exits heat exchanger C through conduit 11 at a temperature between 700° to 1000° F. and a pressure between 15 and 35 psig but preferably about 25 psig. That volume of flue gas derived regenerator gas in excess of the amount required for MOGD catalyst regeneration is passed through conduit 12 to bypass the MOGD swing reactor operating in a catalyst regeneration mode and into conduits 13 and 8 to the FCC flue gas cooler D. The flue gas derived regenerator gas passing through conduit 11 is filtered and passed through the regenerator reactor (III) through conduit 14 at a temperature preferably about 700° F.–950° F. and a pressure preferably about 23 psig. Zeolite catalyst in the fixed bed regenerator reactor is then regenerated under oxidative regeneration conditions as described in the aforenoted referenced patents. The regenerator gas effluent stream is passed from the reactor through conduit 15 and to the FCC flue gas cooler through conduit 13 where the consolidated or combined flue gas and regenerator gas streams are cooled, electrostatically treated to remove suspended particles in the electrostatic precipitator E and conducted to stack A through conduit 16 for discharge to the atmosphere.

A surprising discovery of the instant invention is that the nitrogen compounds typically present in flue gas do not permanently poison MOGD catalyst as regenerated herein. It is known that nitrogen compounds, such as ammonia, deactivate by adsorbtion on the catalyst, but when the regenerator temperature is raised to about 950° F. nitrogen compounds are desorbed and catalyst activity is regained, as practiced herein.

A key element of the present invention is the adaptability of FCC regenerator flue gas for use as a catalyst regenerator gas for catalytic hydrocarbon conversion processes such as MOGD. In particular, it is well know that zeolite-type catalysts used in such fixed bed hydrocarbon conversion processes as MOGD are sensitive to the water partial pressure in the regenerator gas stream. It is also well known that water vapor can react with zeolite catalyst hydrothermally during regeneration to substantially alter catalyst activity and render the catalyst less effective for the intended conversion reaction. In the face of this deleterious affect of water vapor on the catalyst during catalyst regeneration it is a surprising discovery that FCC regenerator flue gas can be used as catalyst regenerator gas since that flue gas typically contains approximately 10 volume % water. However, in the preferred practice of the instant invention water is not removed from flue gas prior to introduction to the MOGD regenerator. It has been discovered that the invented once through regeneration system pressure is several times lower than the conventional recirculating regeneration system pressure. Therefore, the invented regeneration system can tolerate several times higher water concentration in the regenerator gas.

Another distinguishing aspect of the present invention is the utilization of FCC regenerator flue gas to preheat the MOGD olefinic feedstock stream to the alternate MOGD process side reactor, resulting in a considerable advantage in energy conservation. The preheating step typically is conducted following the treatment of the FCC regenerator flue gas with nitrogen or air to provide an oxidative regenerator gas stream. However, to those skilled in the art it is obvious that the sequence of these steps may be reversed.

Of particular advantage in the present invention is the discovery of the dual adaptability of elements of the FCC regenerator process to dual usage with MOGD catalyst regeneration and the compatibility of FCC flue gas with a once through design for MOGD catalyst regeneration. Substantial savings in the cost of an MOGD plant are realized by eliminating the regeneration recycle gas compressor, the make-up air compressor, several heat exchangers and other vessels that are required as part of a conventional MOGD regeneration process design. FCC equipment elements that are used in a dual function include the FCC regenerator main air blower, the FCC flue gas cooler and all of the associated stack gas clean-up equipment. In addition, the FCC flue gas is advantageously used as a heat source to generate steam or preheat the MOGD olefinic feedstock.

While the novel system of the present invention has been described by reference to a particular embodiment, there is no intent to limit the inventive concept except as set forth in the following claims.

What is claimed is:

1. An integrated once through reactor system for regenerating acidic medium pore zeolite olefin or oxygenate feedstock conversion catalyst with flue gas, comprising in combination:

fluid catalytic cracking catalyst regenerator means for providing said flue gas containing oxygen;

at least two fixed bed reactor means for containing said zeolite catalyst, said reactor means receivably connected to said regenerator means for alternately receiving said flue gas therefrom;

feedstock conduit means connected to said reactor means for alternately transferring said feedstock thereto;

conversion product conduit means receivably connected to said reactor means for alternately transferring said product therefrom;

flue gas conduit means receivably connected to said reactor means for alternately transferring flue gas therefrom.

2. The reactor system according to claim 1 further comprising indirect heat transfer means in communication with said feedstock conduit and said regenerator for transferring heat from said regenerator flue gas to said feedstock.

3. The reactor system according to claim 1 wherein said regenerator is connected to a means for admixing oxygen, inert gas or fuel gas with said flue gas to increase or decrease the oxygen content thereof.

* * * * *